United States Patent
Sako (10) Patent No.: US 8,830,222 B2
(45) Date of Patent: Sep. 9, 2014

(54) INFORMATION PROCESSING APPARATUS, INFORMATION PROCESSING SYSTEM, CONTROL METHODS, AND STORAGE MEDIUM

(75) Inventor: Ritsuto Sako, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 595 days.

(21) Appl. No.: 12/873,106

(22) Filed: Aug. 31, 2010

(65) Prior Publication Data

US 2011/0060951 A1  Mar. 10, 2011

(30) Foreign Application Priority Data

Sep. 10, 2009 (JP) ................................ 2009-209814

(51) Int. Cl.
- *G06F 17/00* (2006.01)
- *G06F 3/048* (2013.01)
- *H04N 1/00* (2006.01)

(52) U.S. Cl.
CPC ....... *H04N 1/00413* (2013.01); *H04N 1/00411* (2013.01); *H04N 1/00474* (2013.01); *H04N 1/00424* (2013.01); *H04N 1/00464* (2013.01); *H04N 1/00973* (2013.01); *H04N 2201/0094* (2013.01)
USPC .......................................... 345/418; 715/778

(58) Field of Classification Search
CPC ..................... G03G 2215/00109; G06F 21/84; G06F 3/1287; G06F 3/1288; G06F 3/1285; H04N 1/00411; H04N 1/00413; H04N 1/00424; H04N 1/00464; H04N 1/00474; H04N 1/00973; H04N 2201/0094
See application file for complete search history.

(56) References Cited

U.S. PATENT DOCUMENTS

| 6,023,681 A * | 2/2000 | Whitt ........................... 705/7.29 |
| 2003/0063313 A1 | 4/2003 | Ito |
| 2004/0186904 A1 * | 9/2004 | Oliveira ........................ 709/225 |

FOREIGN PATENT DOCUMENTS

JP  2007-230244 A  9/2007

* cited by examiner

Primary Examiner — Kee M Tung
Assistant Examiner — Sing-Wai Wu
(74) Attorney, Agent, or Firm — Canon USA, Inc. IP Division

(57) ABSTRACT

An apparatus determines whether a current display is a web screen, when a user operation performed via the web screen indicates a display of a native screen and when a web server instructs the apparatus to display the native screen. The apparatus switches the current display to the native screen when the current display is the web screen, and maintains the current display when the current display is not the web screen.

13 Claims, 8 Drawing Sheets

INFORMATION PROCESSING APPARATUS, INFORMATION PROCESSING SYSTEM, CONTROL METHODS, AND STORAGE MEDIUM

BACKGROUND OF THE INVENTION

1. Field of the Invention

The present invention relates to an information processing apparatus, an information processing system, control methods, and a storage medium.

2. Description of the Related Art

A technique, in which an information processing apparatus such as a personal computer (PC) is connected with a web server on a network and an operation screen provided from the web server is displayed on a web browser included in the information processing apparatus, has been known.

In such a case, a web browser in an information processing apparatus requests an operation screen to a Web server. Then, a web application on the web server sends a Hyper Text Markup Language (HTML) file, which is for displaying the operation screen on the web browser, to the information processing apparatus, in response to the request from the information processing apparatus. The web browser in the information processing apparatus analyzes the received HTML file, and displays an operation screen based on descriptions in the received HTML file.

Further, when a user inputs an instruction via the operation screen displayed on the web browser, the web browser notifies the input instruction to the web server. A web application on the web server that has received the notification of the instruction executes processing according to the input instruction.

Recently, in a multifunction peripheral (MFP) including a scanner and a printer, there have been MFPs including the aforementioned web browser. Such an MFP displays, using the aforementioned steps, the operation screen provided from the web server on the web browser in the MFP, and accepts various kinds of instructions from a user.

For example, Japanese Patent Application Laid-Open No. 2007-230244 discusses a technique in which a web server provides an operation screen for inputting instructions for utilizing each function included in the MFP.

More particularly, a user of the MFP inputs an instruction to the MFP via the operation screen displayed on the web browser. In the MFP discussed in Japanese Patent Application Laid-Open No. 2007-230244, the web browser in the MFP notifies the input instruction to the web server. The web server that has received the notification requests the MFP to execute various kinds of processing according to the contents of the instruction input by the user.

The MFP that has received the request executes the requested processing. In this way, it becomes unnecessary to store all menu data in the MFP for operating the MFP, and the menu data can be easily changed on the web server.

However, the aforementioned conventional technique discussed in Japanese Patent Application Laid-Open No. 2007-230244 has the following problem. The information processing apparatus according to the aforementioned conventional technique has many functions in general. Thus, a configuration, in which the information apparatus does not realize all of the operation screens on an operation screen displayed on a web browser (hereinafter referred to as a web screen) but realizes a part of the operation screens on an operation screen previously stored in the information apparatus (hereinafter referred to as a native screen), has been considered. Having such a configuration, the information processing apparatus can efficiently realize the web application.

Further, for realizing such a configuration, the web application needs to change a screen displayed on a user interface (UI) of the information processing apparatus from the web screen to another screen (the native screen). For realizing this change, a system in which the information processing apparatus provides a web service for controlling the UI screen, and the web application performs a screen transition by utilizing the web service.

However, in such a system, a user may perform another operation for displaying another screen (for example, a display instruction for a status display screen of a device or a job history screen), while changing to the native screen based on a user operation to the web screen.

In such a case, since a native screen based on the previously operated content is displayed even though the user intentionally performs another operation, the operability is much decreased.

SUMMARY OF THE INVENTION

According to an aspect of the present invention, an apparatus includes a control unit, a notification unit, a determination unit, and a screen switching unit. The control unit is configured to display a web screen or a native screen on a display unit, where the web screen is generated by using screen information received from a web server and the native screen is generated by using screen information stored in the apparatus. The notification unit is configured to notify the web server a user operation performed via the displayed web screen. The determination unit is configured to determine whether a current display is the web screen when the web server instructs to display the native screen as a response to a notification of the user operation. The screen switching unit is configured to switch the current display to the native screen when the current screen is the web screen, and to maintain the current display when the current display is not the web screen.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

An exemplary embodiment of the present invention will be described below. Individual exemplary embodiments described below will be helpful to understand various concepts such as a dominant concept, a middle concept, and a subordinate concept of the present invention. A technical scope of the present invention is determined by claims, and is not limited by the individual exemplary embodiments described below.

<Configuration of an Image Forming Apparatus>

Figure 1:
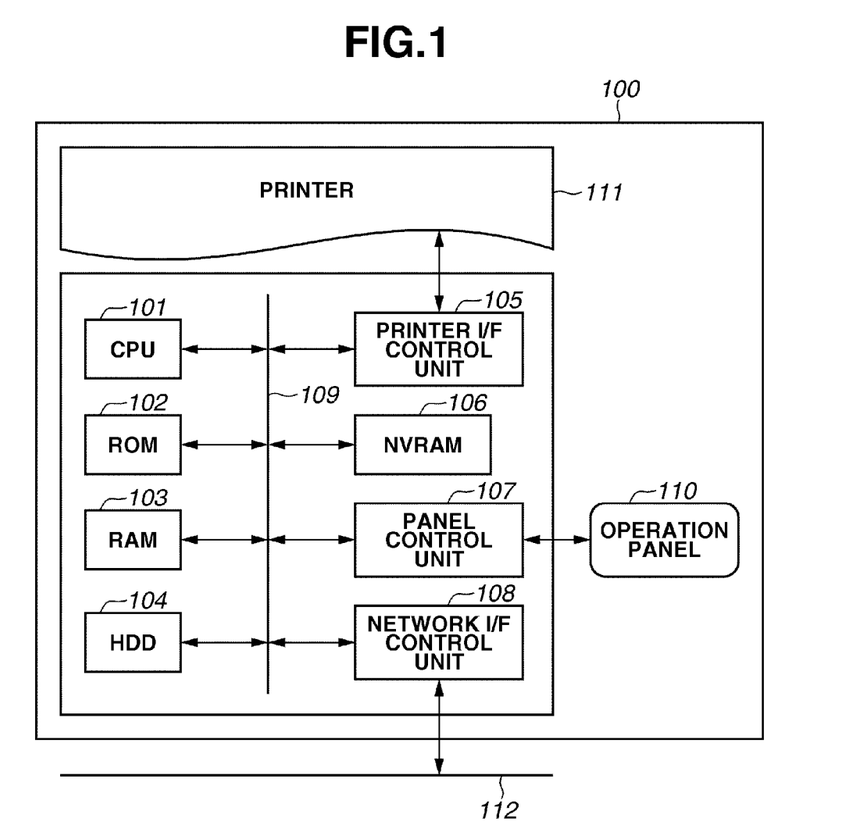
FIG. 1 is a block diagram illustrating a hardware configuration of an image forming apparatus 100 according to a first exemplary embodiment.

A first exemplary embodiment of the present invention will be described below with reference to FIGS. 1 to 7. A hardware configuration of an image forming apparatus 100 according to the present exemplary embodiment will be described with reference to FIG. 1. As illustrated in FIG. 1, an image forming apparatus 100 such as an MFP will be described below as an example of an information processing apparatus according to the present invention.

A central processing unit (CPU) 101 executes a software program stored in a read only memory (ROM) 102 or a hard disk drive (HDD) 104, and controls the entire apparatus. The ROM 102 stores a boot program and fixed parameters of the apparatus. A random access memory (RAM) 103 temporarily stores data when the CPU 101 controls the apparatus.

The HDD 104 is used for storing various data such as print data. A printer interface (I/F) control unit 105 is configured to control a printer 111. A nonvolatile random access memory (NVRAM) 106 stores various setting values of the image forming apparatus 100.

A panel control unit 107 controls a control panel 110 including a display unit and an operation unit, and controls displays of various information and an input instruction from a user. A network interface (I/F) control unit 108 controls sending/receiving data to/from a local area network (LAN) 112.

The CPU 101, the ROM 102, the RAM 103, the HDD 104, the printer I/F control unit 105, the NVRAM 106, the panel control unit 107, and the network I/F control unit 108 are connected to a bus 109. The bus 109 is a system bus used for sending/receiving control signals to/from the CPU 101 and data signals between each apparatus.

<Configuration of a Printing System>

Figure 2:
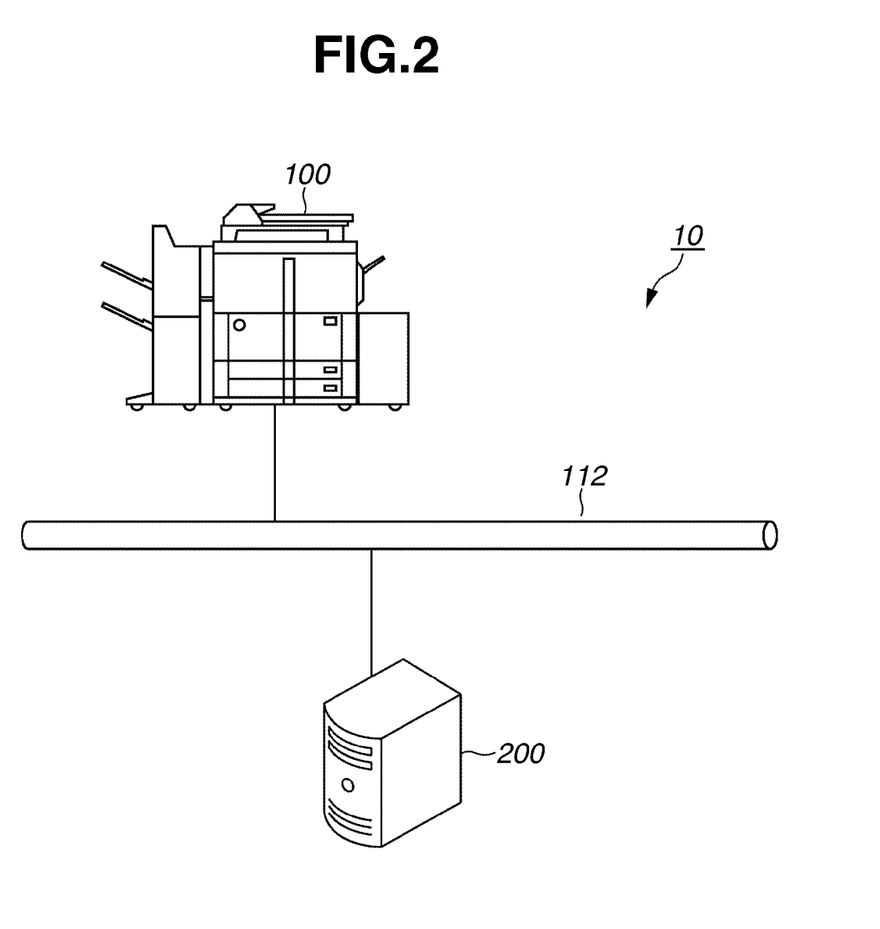
FIG. 2 illustrates a configuration of a printing system using an image forming apparatus 100 according to the first exemplary embodiment.

A configuration of a printing system 10 using the image forming apparatus 100 according to the present exemplary embodiment will be described with reference to FIG. 2.

In the printing system 10, which is an example of an information processing system, the image forming apparatus 100 having a web browser function and the web server 200 having a web server function are connected via the LAN network 112. The image forming apparatus 100 and the web server 200 are connected with the LAN network 112 and mutually communicable.

A web application operates on the web server 200. A web browser operates on the image forming apparatus 100, and executes the web application on the web server 200. According to the present exemplary embodiment, the image forming apparatus 100 acquires an operation screen for executing functions of the image forming apparatus 100 from the web application on the web server 200, and displays the operation screen on the web browser.

Hereinafter, a screen displayed on the web browser is referred to as a web screen. Further, the image forming apparatus 100 can display a screen previously stored in the image forming apparatus 100. Hereinafter, the screen previously stored in the image forming apparatus 100 is referred to as a native screen.

<Functional Configuration>

Figure 3:
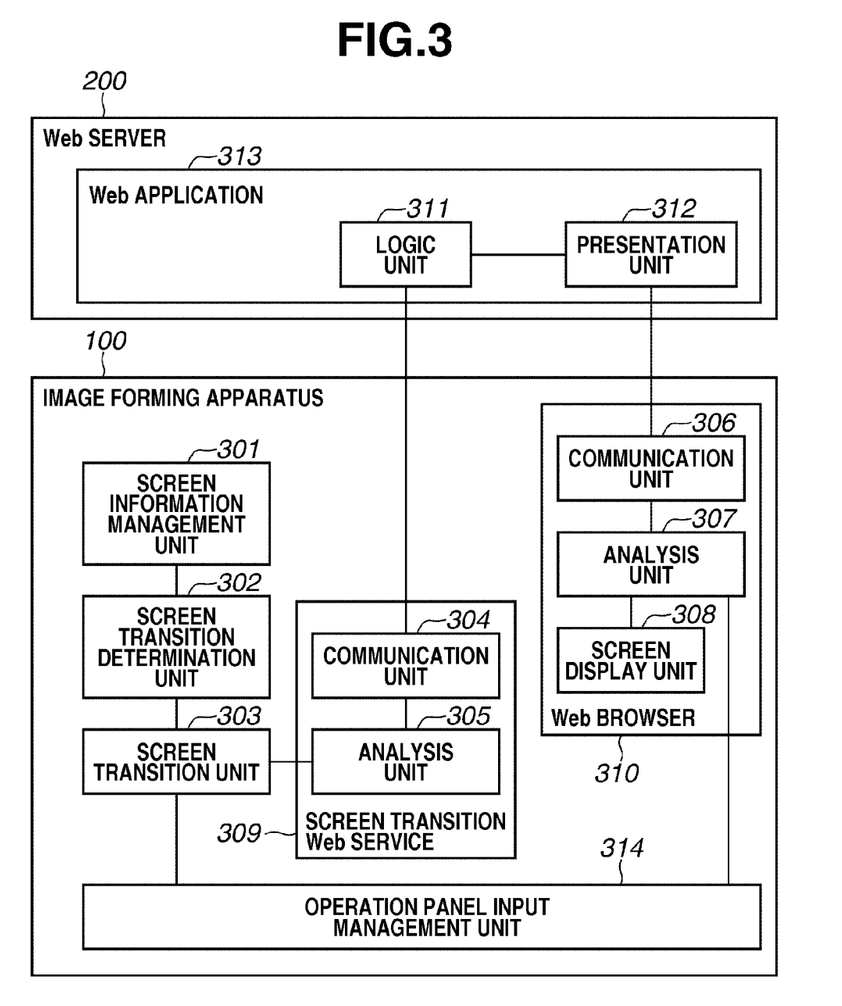
FIG. 3 is a block diagram illustrating functional configurations of an image forming apparatus 100 and a web server 200 according to the first exemplary embodiment.

Functional configurations of the image forming apparatus 100 and the web server 200 will be described with reference to FIG. 3. In addition, only functional configurations that are important for executing the present invention will be mainly described below. Therefore, the image forming apparatus and the information processing apparatus in the present invention can be realized including other functional configurations.

The image forming apparatus 100 includes a screen information management unit 301, a screen transition determination unit 302, a screen transition unit 303, a screen transition web service 309, a web browser 310, and an operation panel input management unit 314.

The screen transition web service 309 is configured with a communication unit 304 and an analysis unit 305. The web browser 310 includes a communication unit 306, an analysis unit 307, and a screen display unit 308. The web server 200 includes a web application 313. The web application 313 includes a logic unit 311 and a presentation unit 312.

The communication unit 306 in the web browser 310 receives HTML contents provided by the presentation unit 312. The analysis unit 307 analyzes the received HTML contents, and generates screen data for displaying thereof on the operation panel 110.

A screen display unit 308 functions as a display control unit, and displays screen data generated by the analysis unit 307 on the operation panel 110. According to the present exemplary embodiment, the screen display unit 308 displays the web screen generated based on screen information provided from the web server 200, or displays the native screen generated based on screen information previously stored in the ROM 102 and the HDD 104.

The operation panel input management unit 314 manages input processing when a user operates a panel. For example, when the user operates the web browser 310, the operation panel input management unit 314 notifies the operated contents to the analysis unit 307. The analysis unit 307 analyzes the input contents, and sends a hypertext transfer protocol (HTTP) request to the presentation unit 312 via transmission unit 306.

The presentation unit 312 sends the received HTTP request to the logic unit 311. The logic unit 311 analyzes the received HTTP request. As a result of the analysis of the sent HTTP request, when a screen transition to a screen other than the web screen is necessary, the logic unit 311 sends the HTTP request instructing the screen transition to the communication unit 304 in the screen transition web service 309.

The communication unit 304 sends the received HTTP request to the analysis unit 305, and the analysis unit 305 analyzes the processing.

Based on a result analyzed by the analysis unit 305, the screen transition determination unit 302 determines whether the screen transition determination unit 302 causes the screen transition unit 303 to perform the screen transition processing. The screen transition determination unit 302 determines whether the screen transition is possible based on current screen information managed by the screen information management unit 301 and information of a screen transition request source notified from the screen transition unit 303.

The screen transition unit 303 functions as a screen switching unit and a response unit, and executes screen transition processing according to a determination by the screen transition determination unit 302. Further, the screen transition unit 303 notifies, to the screen transition web service 309, the result whether the screen transition unit 303 has performed the screen transition as a response.

Further, the operation panel input management unit 314 instructs screen transition to the screen transition unit 303 when the operation panel input unit 314 detects a user operation for changing the screen to a screen other than the web screen.

<Screen Control>

A procedure of a screen control in the image forming apparatus 100 and the web server 200 will be described with reference to FIG. 4. In the present exemplary embodiment, a screen control when a user executes a copy function, which is one of functions provided by the web application 313, by using an operation screen previously stored on the image forming apparatus 100 (a native screen) is described.

In step S400, the web browser 310 requests a menu screen to the web application 313. In step S401, the web application 313 sends the menu screen to the web browser 310.

In step S402, the web browser 310 receives selection of a function by a user operation from the displayed menu screen. In addition, in the present exemplary embodiment, a case, in which a user selects a copy function realized by utilizing a native screen, is assumed. In step S403, the web browser 310 requests a copy function screen to the web application 313 according to the function selected by the user operation.

In step S404, the web application 313 notifies a display instruction of a copy screen to the screen transition web service 309 since the copy function is realized by utilizing the operation screen of the image forming apparatus 100. In step S405, when the screen transition web service 309 receives the display instruction, the screen transition web service 309 notifies a transition instruction of the copy screen to the screen transition unit 303.

In step S406, the screen transition unit 303 inquires permission/inhibition of a transition of the copy screen to the screen transition determination unit 302. In step S407, the screen transition determination unit 302 determines the permission/inhibition of the transition of the copy screen. In step S408, the screen transition determination unit 302 sends a response (a result of determination) of the permission/inhibition of the transition of the copy screen to the screen transition unit 303.

In step S409, the screen transition unit 303 executes a screen transition when a determination result allows the screen transition. In step S410, the screen transition unit 303 notifies a transition result to the screen transition web service 309. In step S411, the screen transition web service 309 notifies, to the web application 313, a result of execution in response to the display instruction of the copy screen.

<Menu Screen>

Figure 5:
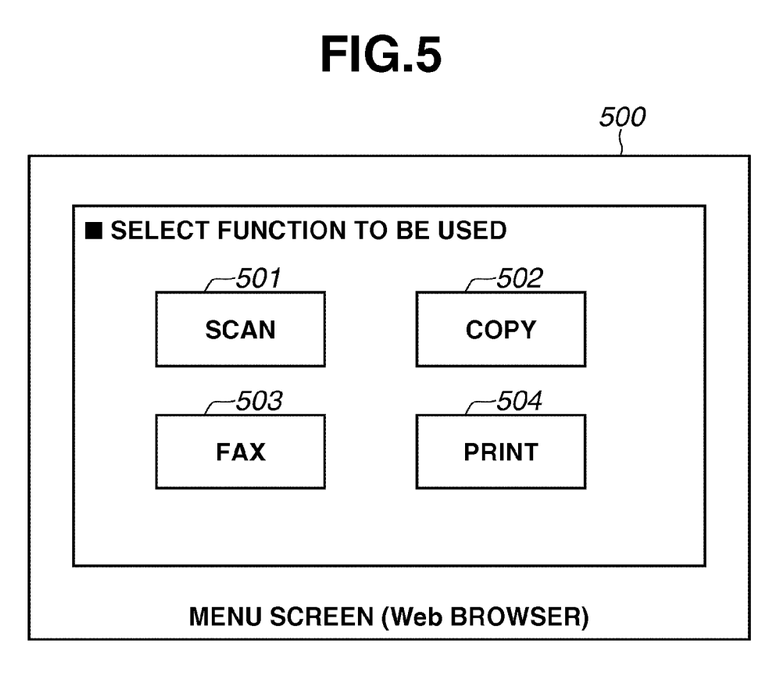
FIG. 5 illustrates one example of a menu screen 500 displayed on a web browser 310 according to the first exemplary embodiment.

Then, an example of a menu screen 500 displayed on the web browser 310 in step S401 will be described with reference to FIG. 5.

The menu screen 500 includes selection buttons 501, 502, 503, and 504 for selecting which function of the image forming apparatus 100 is used. When a user presses the selection button 501, a scan function is selected. When a user presses the selection button 502, a copy function is selected. When a user presses the selection button 503, a facsimile (FAX) function is selected. When a user presses the selection button 504, a print function is selected.

Figure 4:
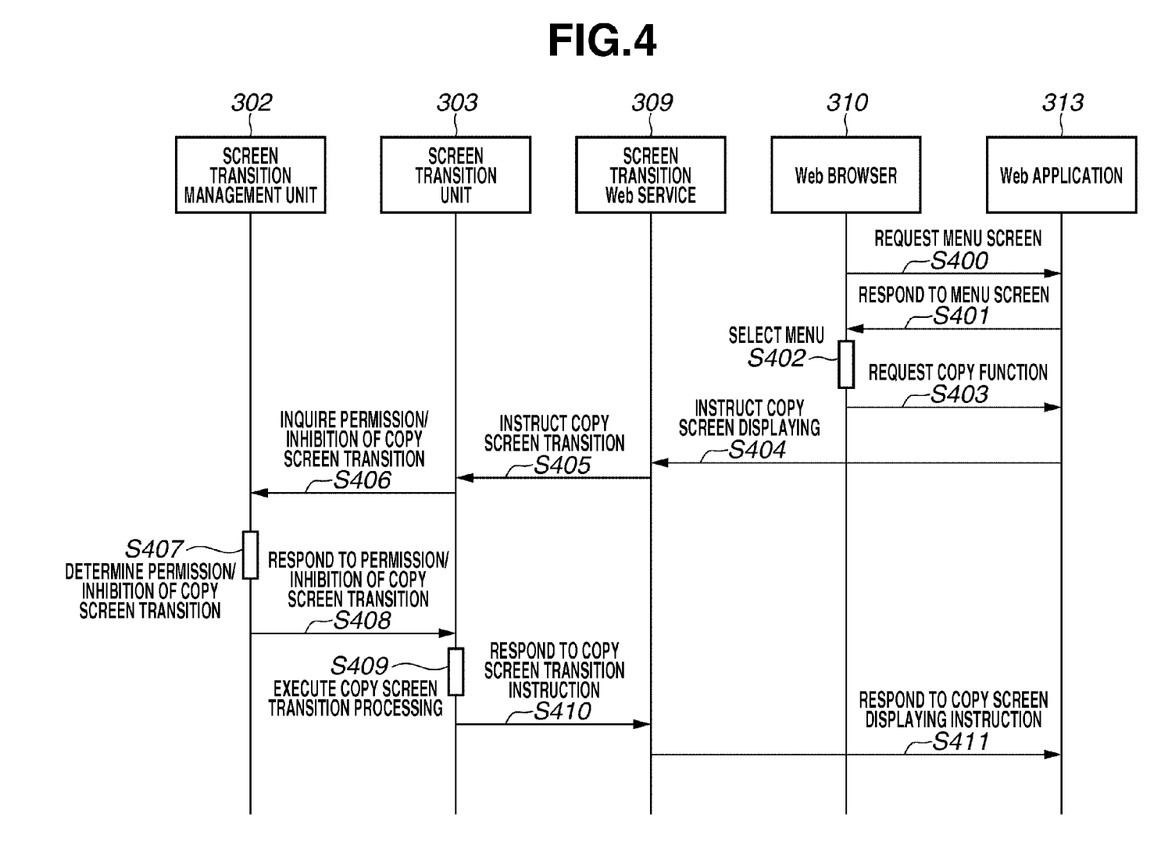
FIG. 4 is a sequence diagram illustrating screen controls of the image forming apparatus 100 and the web server 200 according to a first exemplary embodiment.

In step S402 in FIG. 4, when any one of the selection buttons 501 to 504 is pressed by a user operation, the web browser 310 determines which function is to be used. In step S403, when a user selects a function to be executed, the web browser 310 requests, to the web application 313, a function screen corresponding to the pressed button.

<Procedure at a Time of Screen Transition>

Figure 6:
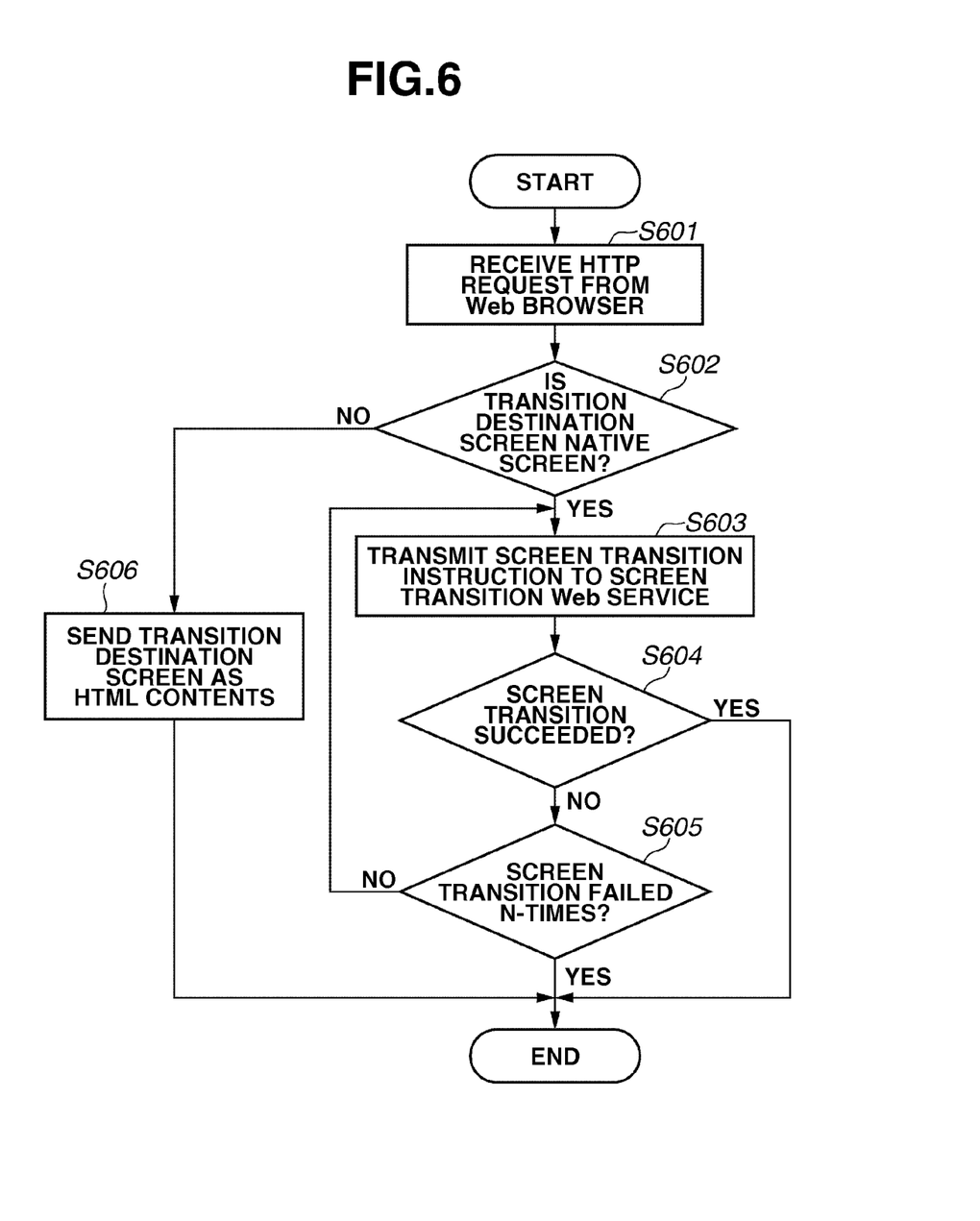
FIG. 6 is a flowchart illustrating a procedure of a web application 313 at a time of performing a screen transition according to the first exemplary embodiment.

A procedure of the web application 313 at a time of performing a screen transition will be described with reference to FIG. 6.

In step S601, the web application 313 receives an HTTP request from the web browser 310. In step S602, the web application 313 determines whether a change destination screen is a native screen. When the change destination screen is not the native screen (NO in step S602), the processing proceeds to step S606. In step S606, the web application 313 sends, to the web browser 310, the HTML content (screen information of the web screen), which is the change destination screen, and then ends the processing.

On the other hand, when the change destination screen is the native screen (YES in step S602), the processing proceeds to step S603. Then, the web application 313 sends, to the screen transition web service 309, an instruction of a screen transition, i.e., an instruction to display the native screen.

In step S604, the web application 313 determines whether the screen transition succeeds. The determination is performed based on a result notified as a response from the screen transition web service 309. When the screen transition succeeds (YES in step S604), the processing ends. When the screen transition fails (NO in step S604), the processing proceeds to step S605.

In step S605, the web application 313 functions as a repeat unit, and determines whether a number of times of a failure reaches N, i.e., a predetermined number of times. When the number of times of a failure reaches N, the processing ends. When the number of times of a failure does not reach N, the processing returns to step S603, and the web application 313 sends again the instruction of the screen transition.

Then, a procedure of the image forming apparatus 100 at a time of performing screen transition will be described with reference to FIG. 7.

In step S701, the screen transition web service 309 receives an instruction of screen transition from the web application 313. In step S702, the screen transition web service 309 determines whether a current display screen is the web screen by the screen transition determination unit 302.

When the screen transition web service 309 determines that the current display screen is the web screen (YES in step S702), the processing proceeds to step S703. In step S703, the screen transition web service 309 determines that a user is operating the web application 313 via the web browser 310, executes a screen transition by the screen transition unit 303, and notifies a success of the screen transition to the web application 313.

On the other hand, when the current display screen is not the web screen (NO in step S702), the processing proceeds to step S704. In step S704, the screen transition web service 309 determines that the user is operating an application other than the web application 313, maintains the current display screen, and notifies a failure of the screen transition to the web application 313.

Accordingly, when the user operation performed via the web screen indicates a display of the native screen, the information processing apparatus 100 according to the present exemplary embodiment determines whether the current display is the web screen when the information processing apparatus 100 receives an instruction of a display of the native screen from the web server. The information processing apparatus 100 switches the current display to the instructed native screen when the current display is the web screen. The information processing apparatus 100 maintains the current display when the current display is not the web screen.

With such a configuration, based on the user operation via the web screen of the web application, even when a user operation relating to the other application is performed while the screen is changing from the web screen to the native screen, the information processing apparatus 100 can properly switch a screen.

More particularly, if the current display is a screen other than the web screen at a time of changing the screen to the native screen, the information processing apparatus 100 determines that a user intentionally performs the other operation, and does not perform the aforementioned transition to the native screen. Accordingly, the information processing apparatus 100 can provide a user-friendly operation system.

Next, a second exemplary embodiment will be described with reference to FIG. 8.

In the first exemplary embodiment, when the screen transition is not performed in step S704, the screen transition web service 309 notifies the failure of the screen transition to the web application 313, and the processing ends. However, in the second exemplary embodiment, when the screen transition is not performed, the screen transition web service 309 waits for a predetermined time, and confirms again a display screen.

Figure 7:
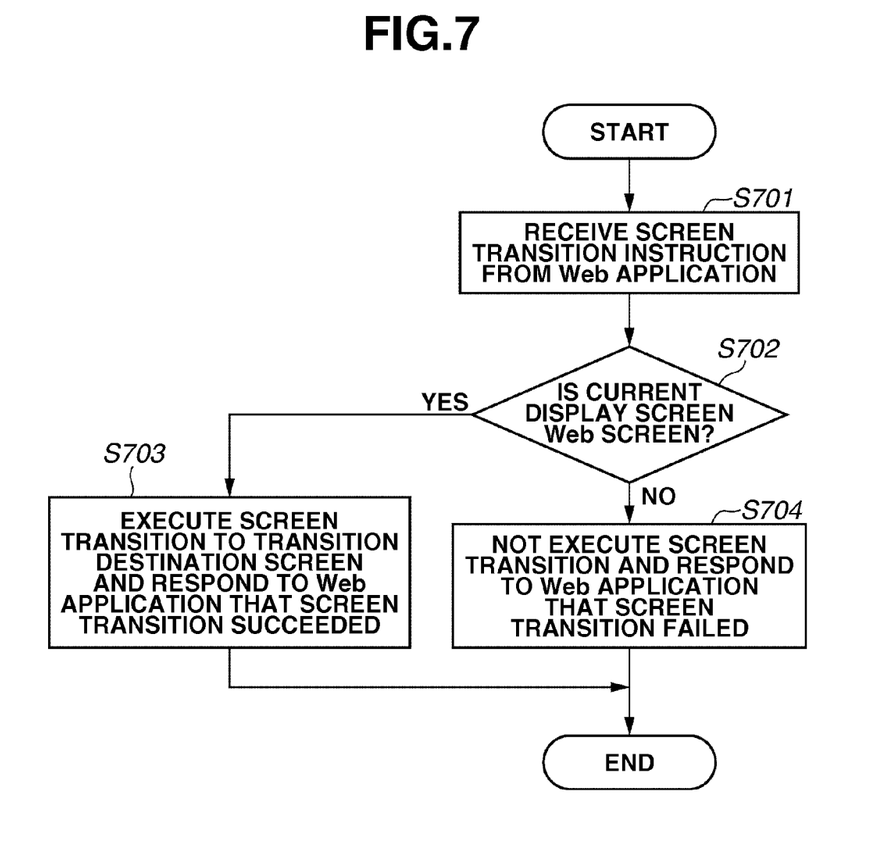
FIG. 7 is a flowchart illustrating a procedure of an image forming apparatus 100 at a time of performing a screen transition according to the first exemplary embodiment.
Figure 8:
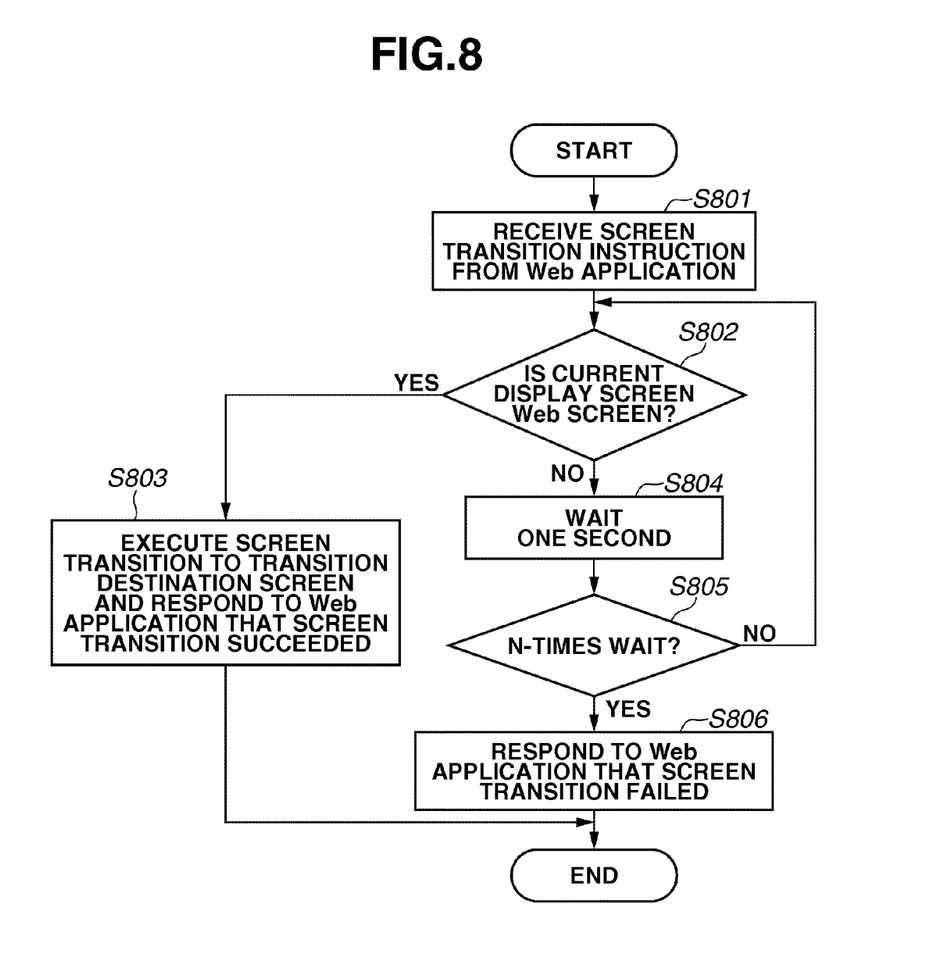
FIG. 8 is a flowchart illustrating a procedure of an image forming apparatus 100 at a time of performing a screen transition according to a second exemplary embodiment.

FIG. 8 illustrates a modified example of the flowchart illustrated in FIG. 7. In addition, processing in step S801, S802, and 5803 is similar to processing in step S701, 5702, and S703 in FIG. 7, so that descriptions will be omitted.

In step 802, when the screen transition web service 309 determines that the native screen is displayed on the display screen (NO in step S802), the processing proceeds to step S805. In step S805, the screen transition web service 309 waits for 1 second.

In step S805, the screen transition web service 309 determines whether a waiting number of times reaches N times. When the waiting number of times reaches N (YES in step S805), the processing proceeds to step S806. In step S806, the screen transition web service 309 notifies a failure of the screen transition to the web application 313 as a response.

More specifically, when the screen transition web service 309 according to the present exemplary embodiment determines that the native screen is displayed on the display screen (NO in step S802), the screen transition web service 309 periodically repeats the determination in step S802. If the native screen is displayed on the display screen for a predetermined time, the screen transition web service 309 notifies the failure of the screen transition as a response.

On the other hand, when the waiting number of times does not reach N (NO in step S805), the processing returns to step S802, and the screen transition web service 309 confirms again the display screen.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-209814 filed Sep. 10, 2009, which is hereby incorporated by reference herein in its entirety.

What is claimed is:

1. An image forming system including a web server and an image forming apparatus having a web browser capable of displaying an operation screen provided by the web server,
the image forming apparatus comprising:
an accepting unit configured to accept an operation from a user via an operation screen displayed by the web browser; and
a notification unit configured to perform a notice to the web server when the operation is accepted by the accepting unit;
the web server comprising:
a transmission unit configured to transmit, to a web service of the image forming apparatus, a request for performing predetermined processing, when the notice by the notification unit is received;
the image forming apparatus further comprising:
a determination unit configured to determine, when the request transmitted by the transmission unit is received, whether or not a currently displayed operation screen is an operation screen displayed by the web browser; and
a control unit configured to cause the predetermined processing to be performed when it is determined that the currently displayed operation screen is an operation screen displayed by the web browser, and not to cause the predetermined processing to be performed when it is determined that the currently displayed operation screen is not an operation screen displayed by the web browser.

2. The image forming system according to claim 1, wherein the image forming apparatus receives the request by using the web service.

3. The image forming system according to claim 1, wherein the accepting unit is configured to accept the operation via the operation screen for selecting a function related to image processing.

4. The image forming system according to claim 3, wherein the function includes at least one of scan, copy, fax, and print.

5. The image forming system according to claim 3, wherein the notification unit performs the notice when a specific function is selected on the operation screen.

6. An image forming apparatus having a web browser capable of displaying an operation screen provided by a web server, comprising:
a notification unit configured to perform a notice to the web server when an operation is accepted by an accepting unit;
a determination unit configured to determine, when a request for performing predetermined processing is received from the web server which has received the notice, whether or not a currently displayed operation screen is an operation screen displayed by the web browser, the request being transmitted to a web service of the image forming apparatus; and a control unit configured to cause the predetermined processing to be performed when it is determined that the currently displayed operation screen is an operation screen displayed by the web browser, and not to cause the predetermined processing to be performed when it is determined that the currently displayed operation screen is not an operation screen displayed by the web browser.

7. The image forming apparatus according to claim 6, wherein the request form the server is received by using the web service.

8. The image forming apparatus according to claim 6, wherein the accepting unit is configured to accept the operation via the operation screen for selecting a function related to image processing.

9. The image forming apparatus according to claim 8, wherein the function includes at least one of scan, copy, fax, and print.

10. The image forming apparatus according to claim 8, wherein the notification unit performs the notice when a specific function is selected on the operation screen.

11. A method in an image forming system including a web server and an image forming apparatus having a web browser capable of displaying an operation screen provided by the web server, comprising:

in the image forming apparatus, accepting an operation from a user via an operation screen displayed by the web browser; and performing a notice to the web server when the operation is accepted in the accepting;

in the web server, transmitting, to a web service of the image forming apparatus, a request for performing predetermined processing, when the notice from the image forming apparatus is received;

in the image forming apparatus, determining, when the request transmitted from the server is received, whether or not a currently displayed operation screen is an operation screen displayed by the web browser; and causing the predetermined processing to be performed when it is determined that the currently displayed operation screen is an operation screen displayed by the web browser, and not causing the predetermined processing to be performed when it is determined that the currently displayed operation screen is not an operation screen displayed by the web browser.

12. A control method for controlling an image forming apparatus having a web browser capable of displaying an operation screen provided by a web server, comprising:

performing a notice to the web server when the operation is accepted in the accepting;

determining, when a request for performing predetermined processing is received from the web server which has received the notice, whether or not a currently displayed operation screen is an operation screen displayed by the web browser, the request being transmitted to a web service of the image forming apparatus; and causing the predetermined processing to be performed when it is determined that the currently displayed operation screen is an operation screen displayed by the web browser, and not causing the predetermined processing to be performed when it is determined that the currently displayed operation screen is not an operation screen displayed by the web browser.

13. A non-transitory computer readable storage medium storing a program for causing a computer to execute the method defined by claim 12.

* * * * *